United States Patent [19]

Nishino et al.

[11] Patent Number: 5,367,334
[45] Date of Patent: Nov. 22, 1994

[54] VIDEO SIGNAL ENCODING AND DECODING APPARATUS

[75] Inventors: Masakazu Nishino, Kashiwara; Chojuro Yamamitsu, Kawanishi; Tatsuro Juri, Osaka; Toyohiko Matsuta, Katano; Shigeru Awamoto, Osaka, all of Japan

[73] Assignee: Matsushita Electric Industrial Co., Ltd., Osaka, Japan

[21] Appl. No.: 882,927

[22] Filed: May 14, 1992

[30] Foreign Application Priority Data

May 20, 1991 [JP] Japan .................. 3-114326
Sep. 24, 1991 [JP] Japan .................. 3-243097

[51] Int. Cl.$^5$ ............................. H04N 7/13
[52] U.S. Cl. .................... 348/389; 348/390; 348/438; 348/705
[58] Field of Search ............... 358/141, 142, 133, 11, 358/12, 181; 348/389, 390, 397, 398, 403, 426, 437, 438, 441, 445, 705; H04N 7/13, 11/04, 7/133, 7/137, 7/00, 11/00

[56] References Cited

U.S. PATENT DOCUMENTS

| | | | |
|---|---|---|---|
| 4,651,208 | 3/1987 | Rhodes et al. | 358/141 |
| 4,888,641 | 12/1989 | Isnardi et al. | 358/141 |
| 4,933,762 | 6/1990 | Guichard et al. | 358/133 |
| 5,010,402 | 4/1991 | Nishino | 358/133 |
| 5,055,927 | 10/1991 | Keesen et al. | 358/141 |
| 5,191,417 | 3/1993 | Skinner et al. | 358/141 |
| 5,208,670 | 5/1993 | Sugimori et al. | 358/141 |

FOREIGN PATENT DOCUMENTS 0498616 8/1992 European Pat. Off. .
9011663 10/1990 WIPO .............. H04N 11/00
0020159 12/1991 WIPO .

OTHER PUBLICATIONS

Tsuchida et al.; Multi-Picture System for High Resolution Wide Aspect Ratio Screen; IEEE Transactions on Consumer Electronics, vol. 37, No. 3, Aug. 1991, New York US pp. 313-319.

Primary Examiner—David E. Harvey
Attorney, Agent, or Firm—Stevens, Davis, Miller & Mosher

[57] ABSTRACT

An encoding and decoding apparatus for a video signal and a high-definition television signal is disclosed. For the picture A having the horizontal to vertical screen frame ratio of 4:3, the picture B having the horizontal to vertical screen frame ratio of 16:9 and the picture C having the horizontal to vertical screen frame ratio of 16:9 and having a larger number of vertical pixels than that of the picture A and picture B, the apparatus limits the band of the picture C to obtain the picture D having the same numbers of horizontal and vertical pixels respectively as those of the picture B, and high-efficiency encodes the picture A, picture B or picture D in the same method. The apparatus obtains the additional picture E which is a difference between the picture D and the picture C, or a difference between the picture D' which is a result of decoding a signal that has been obtained by high-efficiency encoding the picture D and the picture C, and then high-efficiency encodes the additional picture E obtained.

19 Claims, 11 Drawing Sheets

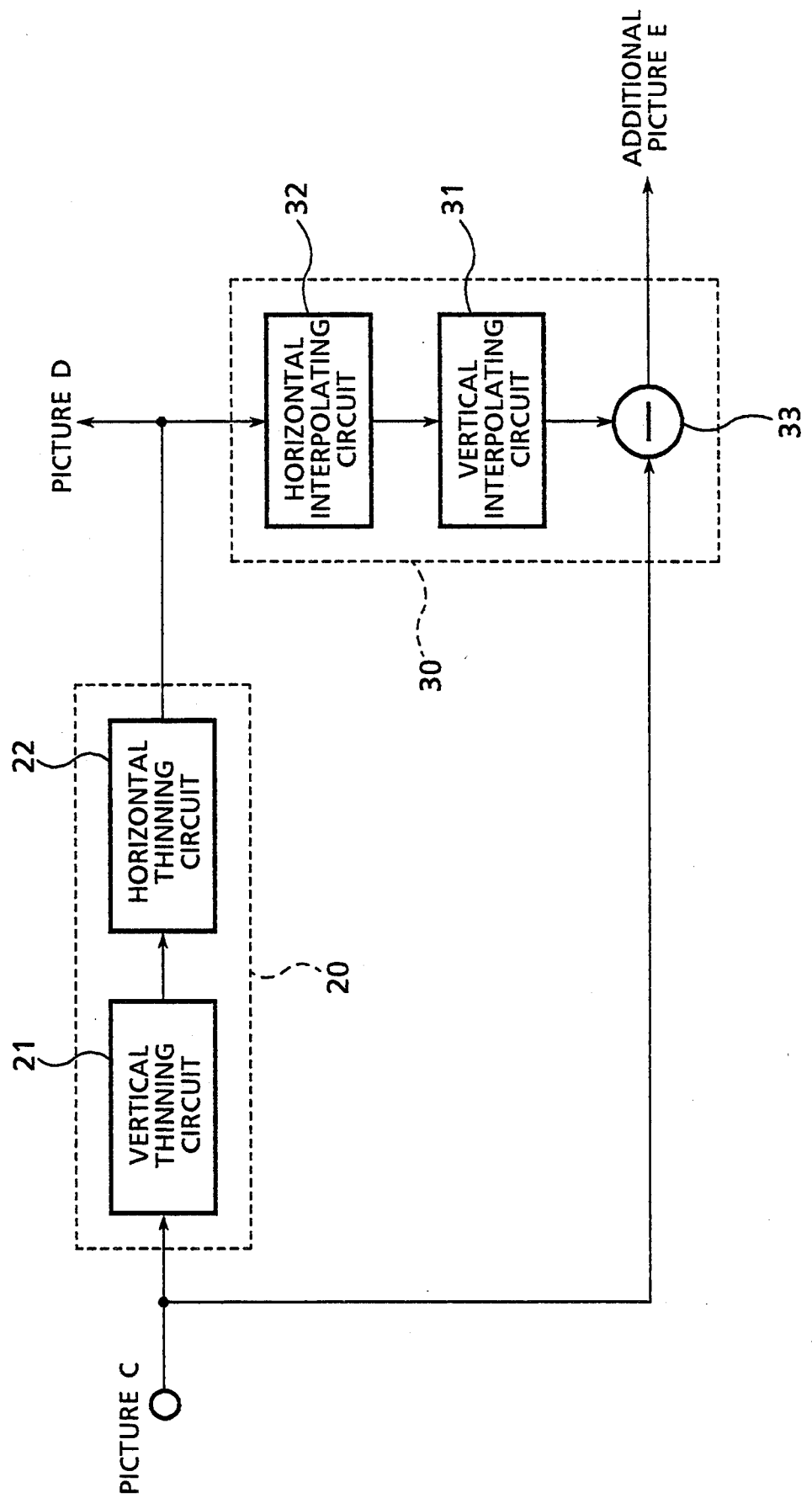

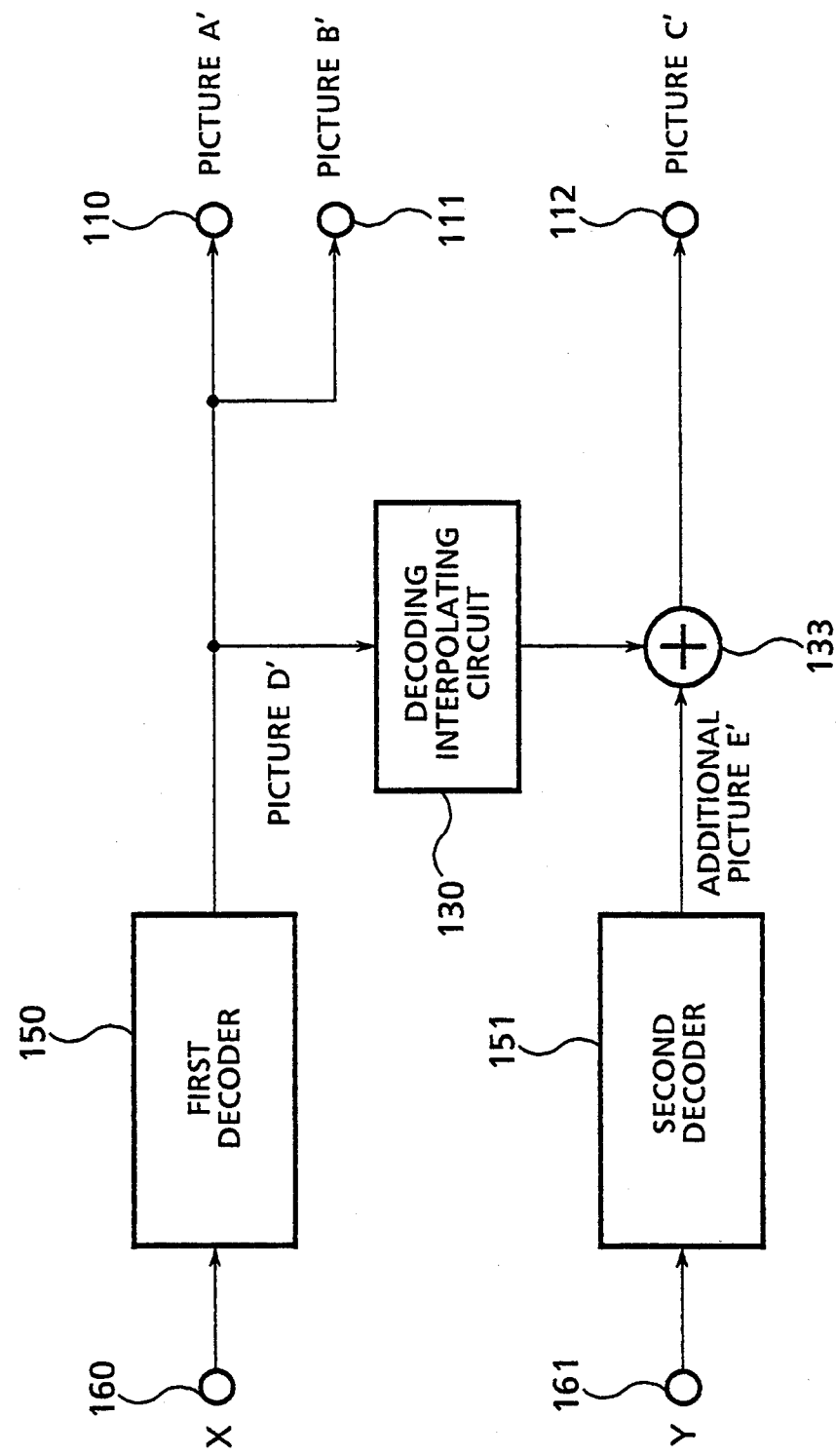

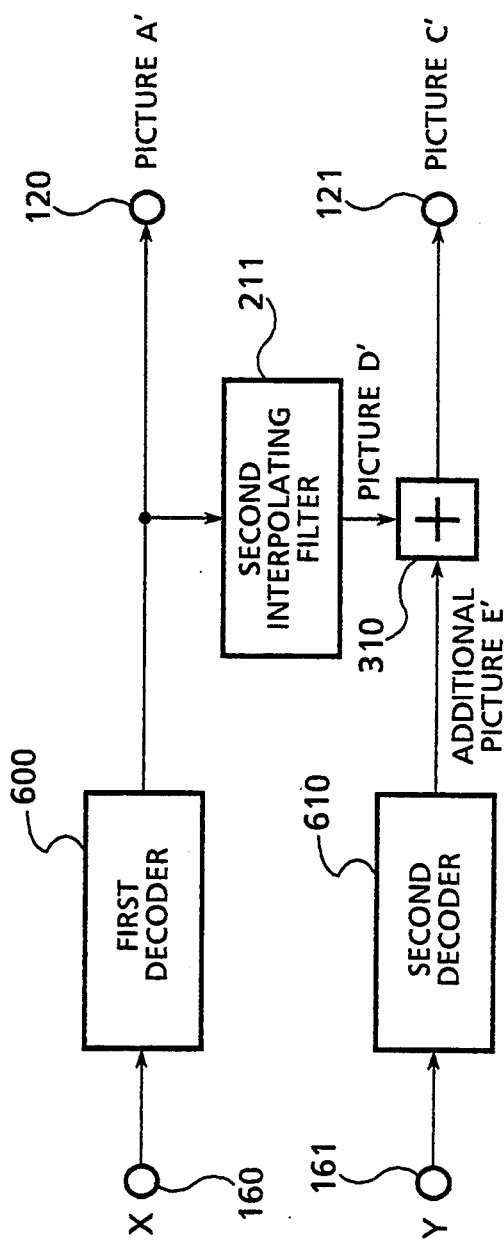
F I G. 9
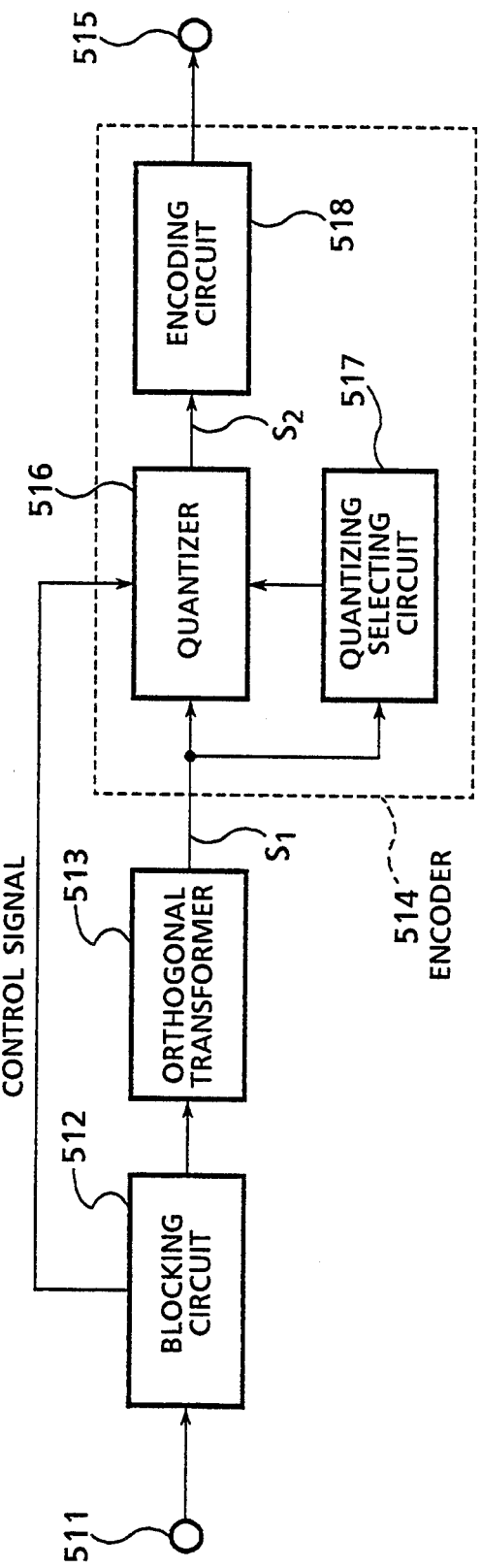
F I G. 12

$H_2 > H_1$
$V_2 > V_1$ $V_2 : H_2 = 9 : 16$ $V_1 : H_1 = 3 : 4$ $V_1 : H_1 = 9 : 16$ $V_2 : H_2 = 9 : 16$
$H_2 \geqq H_3 \geqq H_1$
$V_2 \geqq V_3 > V_1$ $V_1 : H_1 = 3 : 4$ $V_1 : H_1 = 9 : 16$

VIDEO SIGNAL ENCODING AND DECODING APPARATUS

BACKGROUND OF THE INVENTION

1. Field of the Invention

The present invention relates to an encoding and decoding apparatus for encoding and decoding standard video signals and high definition video signals.

2. Description of the Related Arts

In general, a picture signal has a very large quantity of information. In recording or transmitting a picture signal, a method for reducing quantity of information included in the picture signal with a high-efficiency coding without deteriorating picture quality for a visual sensation has been employed. For example, an encoding apparatus of a prior art uses an orthogonal transformation method as shown in FIG. 14 illustrating a block diagram showing configuration. In FIG. 14, numeral 1 designates an input terminal, 2 a blocking unit, 3 an orthogonal transformer, 4 an encoder and 5 an output terminal. The encoding apparatus, at first, puts an input signal inputted from the terminal 1 into blocks of a predetermined size by the blocking unit 2. Then, the encoding apparatus orthogonally transforms each block by the orthogonal transformer 3 and encodes the blocked input signal by the encoder 4. The quantity of data after encoding is predetermined. Therefore, the encoder 5 controls encoding so that the quantity of data after the encoding becomes not larger than the predetermined quantity. For example, the encoder 5 controls to gather m blocks of signals and to encode them so that the quantity of the encoded data is always kept under a predetermined data quantity x.

The above-described prior-art structure, however, has the following problem. When signals of different formats are inputted, such as picture signals of 4:3 and 16:9 for the horizontal to vertical screen frame ratio and high-definition picture signals having a wide frequency range, these signals should be processed with individually different coding data formats. Accordingly, encoded data corresponding to picture signals of different formats can only be decoded by individual decoders respectively.

SUMMARY OF THE INVENTION

It is an object of the present invention to provide an encoding and decoding apparatus which can cope with either one of signals having the horizontal to vertical frame ratio of 4:3 or 16:9 or high-definition picture signals.

In order to achieve the above object, the encoding and decoding apparatus of the present invention includes: input terminals for receiving picture signals of a picture A having a horizontal to vertical screen frame ratio of 4:3, a wide picture B having a larger horizontal to vertical screen frame ratio than the ratio of the picture A and a picture C having the same horizontal to vertical screen frame ratio as the ratio of the picture B but with a larger number of pixels in vertical direction than the picture A and picture B, a band limiting unit for obtaining a picture D having the same numbers of horizontal and vertical pixels as those of the picture B by limiting the band of the picture C; a differential unit for obtaining a difference between the picture C and the picture D to have an additional picture E; a first encoder for high-efficiency encoding the picture A, picture B or picture D; and a second encoder for high-efficiency encoding the additional picture E.

With the above-described configuration, the first encoder executes a common encoding processing for the picture A, picture B and picture C. Therefore, encoded data of any one of these input pictures can be decoded by any decoding apparatus. In other words, an exclusive decoding apparatus for the picture A and picture B can also decode encoded data of the picture C if only the data encoded by the first encoder is used.

In another aspect of the present invention, the encoding and decoding apparatus of the present invention includes: input terminals for receiving picture signals of a picture A of the horizontal to vertical screen frame ratio of 4:3 and a picture C having larger numbers of horizontal and vertical pixels respectively than those of the picture A; a thinning filter limiting the band of the picture C for obtaining a picture D having the same numbers of horizontal and vertical pixels as those of the picture A; a first encoder for high-efficiency encoding the picture A or the picture D output from the thinning filter; an interpolating decoder for decoding an output of the first encoder; a first interpolating filter for interpolating an output of the interpolating decoder so that the output has the same number of pixels as that of the picture C; a subtractor for subtracting an output of the first interpolating filter from the picture C; a second encoder for high-efficiency encoding an output of the subtractor; a first decoder for decoding a signal encoded by the first encoder; a second interpolating filter for interpolating an output of the first decoder so that the output has the same number of pixels as that of the picture C; a second decoder for decoding a signal encoded by the second encoder; and an adder for adding an output of the second interpolating filter to an output of the second decoder.

With the above-described configuration, the first encoder executes a common encoding processing for the picture A and picture C. Therefore, any decoding apparatus can decode any kind of encoded data of these input pictures. In other words, an exclusive decoding apparatus for the picture A can also decode encoded data of the picture C if only the data encoded by the first encoder is used.

BRIEF DESCRIPTION OF THE DRAWINGS

FIG. 3 is a block diagram for showing a configuration of a band limiting circuit and a differential circuit which are structural elements of the encoding apparatus according to the first and third embodiments of the present invention;

FIG. 7 is a block diagram for showing a configuration of a decoding apparatus for decoding data encoded by the encoder of the present invention;

FIG. 9 is a block diagram for showing a configuration of a decoding apparatus of the present invention;

FIG. 12 is a block diagram for showing a configuration of a second encoder in the fifth embodiment of the present invention;

DESCRIPTION OF THE PREFERRED EMBODIMENTS

Figure 1:
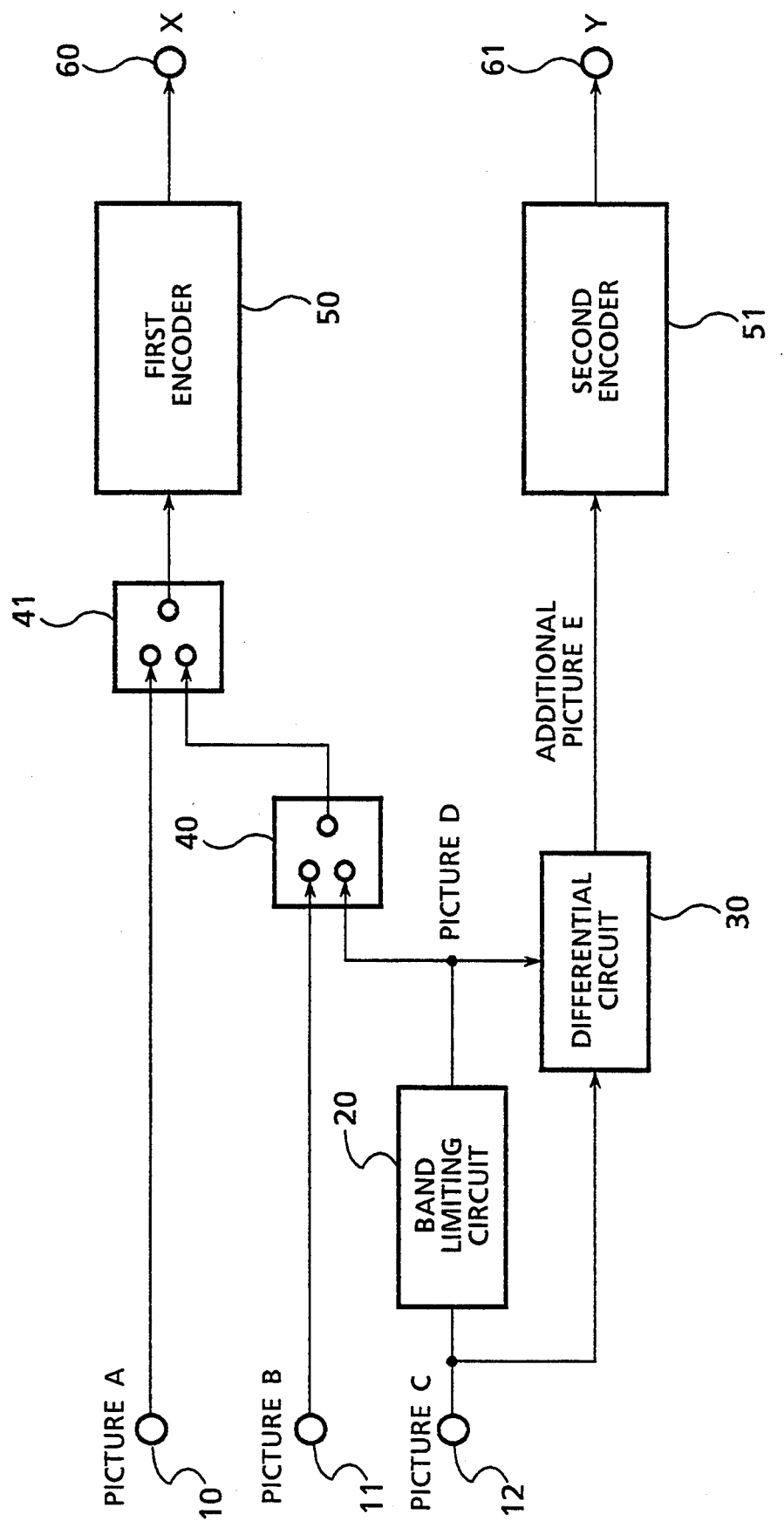
FIG. 1 is a block diagram for showing an encoding apparatus in one embodiment of the present invention.

FIG. 1 is a block diagram for showing an encoder in the first embodiment of the present invention. In FIG. 1, numeral 10 designates an input terminal for inputting a picture A having a horizontal to vertical screen frame ratio of 4:3, 11 designates an input terminal for inputting a picture B having a horizontal to vertical screen frame ratio of 16:9, and 12 designates an input terminal for inputting a picture C having a larger number of vertical pixels than that of the picture A and picture B. 20 designates a band limiting circuit for limiting the band of the picture C to obtain a picture D having the same numbers of horizontal and vertical pixels respectively as those of the picture B. 30 designates a differential circuit for obtaining a difference between the picture C and the picture D to have an additional picture E. 40 designates a first switch for outputting the picture B in a mode for encoding the picture B and for outputting the picture D in a mode for encoding the picture C. 41 designates a second switch for outputting the picture A in a mode for encoding the picture A and for outputting the output of the first switch in a mode for encoding the picture B or the picture C. 50 designates a first encoding circuit for high-efficiency encoding the output of the second switch to produce an encoded signal X, and 51 designates a second encoding circuit for high-efficiency encoding the additional picture E to produce an encoded signal Y. 60 designates a first output terminal for outputting the encoded signal X, being one of output terminals of the encoding apparatus of the invention, and 61 designates a second output terminal for outputting the encoded signal Y, being another one of the output terminals of the encoding apparatus of the invention.

Figure 2A:
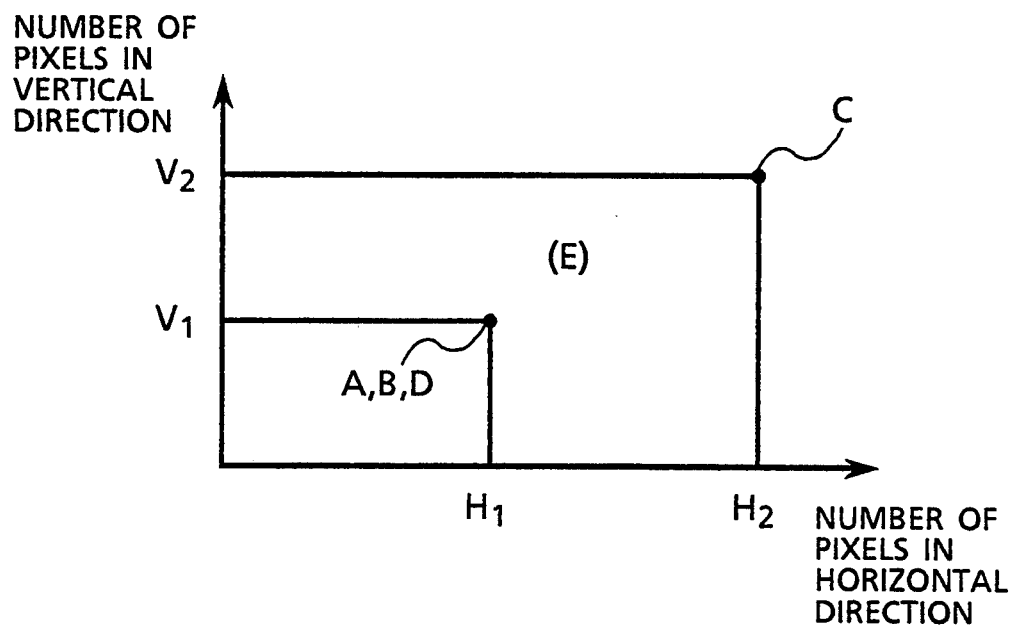
FIG. 2A is a relational diagram described in coordinates showing the relationship between numbers of horizontal and vertical pixels of input pictures in the first embodiment of the present invention.
Figure 2B:
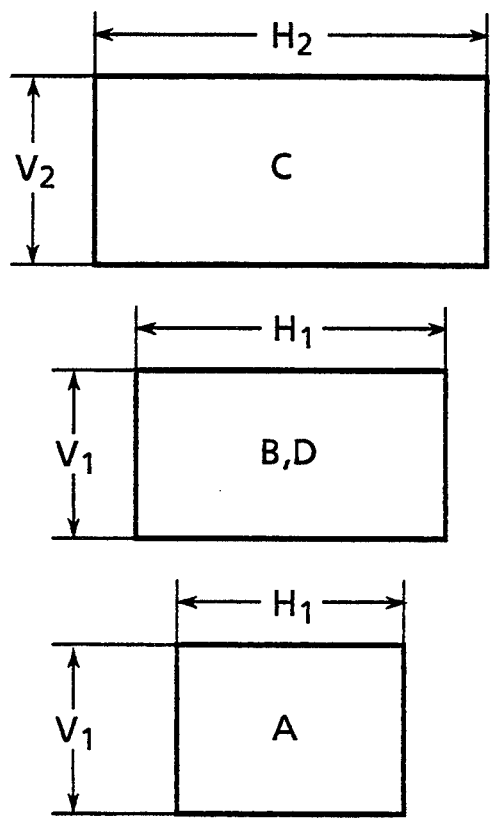
FIG. 2B is a relational diagram for showing the respective input pictures in the first embodiment of the present invention.

FIGS. 2A and 2B are diagrams showing the relationship between numbers of horizontal and vertical pixels of the pictures A, B and C respectively, for explaining the operation of the present embodiment. FIG. 3 is a block diagram showing one example of configuration for explaining the operation of the band limiting circuit 20 and the differential circuit 30.

The operation of the first encoding apparatus shown in FIG. 1 will be explained with reference to FIGS. 2A, 2B and 3.

FIG. 2A shows in a graph the relationship between the numbers of horizontal and vertical pixels for the pictures A, B and C. Numbers of pixels in a horizontal direction are shown in the horizontal axis and numbers of pixels in vertical direction are shown in the vertical axis. Numbers of horizontal and vertical pixels for each picture are expressed by a dark large dot. Both the pictures A and B have the same number of horizontal pixels $H_1$ and the same number of vertical pixels $V_1$ respectively, and the picture C has a number of horizontal pixels $H_2(>H_1)$ and a number of vertical pixels $V_2(>V_1)$. It is assumed that the picture D which is the output of the band limiting circuit 20 has the number $H_1$ of horizontal pixels and the number $V_1$ of vertical pixels, which are the same nun%bets of the picture B respectively. FIG. 2B shows the horizontal to vertical screen frame ratios of the pictures A, B, C and D respectively which are shown on the screen. The picture A has the ratio of 4:3 and the pictures B, C and D have the ratio of 16:9. In general, the picture A corresponds to a standard television signal, the pictures B and D to wide versions of the standard television signal, and the picture C to the signal of a high-definition television (HDTV).

A rectangle formed by the horizontal and vertical axis lines and two perpendicular lines drawn from the point indicative of the numbers of pixels of each picture to each of the axis lines, is considered to represent one of two-dimensional frequency bands.

The operation of the band limiting circuit 20 and the differential circuit 30 will be explained below with reference to the relational diagram of the horizontal and vertical pixel number of each picture shown in FIGS. 2A and 2B.

The band limiting circuit 20 can be structured by a vertical thinning circuit 21 for limiting the band in a vertical direction to reduce the number of vertical pixels and a horizontal thinning circuit 22 for limiting the band in a horizontal direction to reduce the number of horizontal pixels, as shown in FIG. 3. In this case, both the picture C and the picture D have the same horizontal to vertical screen frame ratio of 16:9. Therefore, the vertical thinning circuit 21 limits the band of the picture C in the vertical direction to $V_1/V_2$, and the horizontal thinning circuit 22 limits the band of the picture C in the horizontal direction to $H_1/H_2$. By limiting the band as described above, the picture D after having thinned the pixels does not have any aliasing noise from the high frequency components of the picture C so that the picture D has exactly the same picture format as the picture B.

The differential circuit 30 may be structured by a vertical interpolating circuit 31 for interpolating the pixels in the vertical direction, a horizontal interpolating circuit 32 for interpolating the pixels in the horizontal direction and a subtracting circuit 33, as shogun in FIG. 3. The vertical interpolating circuit 31 interpolates the number of pixels that have been eliminated by the vertical thinning circuit 21 to recover the number $V_2$ of vertical pixels, and the horizontal interpolating circuit interpolates the number of pixels that have been eliminated by the horizontal thinning circuit 22 to recover the number $H_2$ of horizontal pixels. The numbers of the horizontal and vertical pixels of a signal after the interpolation are the same as those of the picture C. However, the signal components of the picture after the interpolation are limited to the frequency components included in the picture D. Accordingly, when the subtracting circuit 33 subtracts the signal interpolated by the vertical interpolating circuit 31 and the horizontal interpolating circuit 32 from the picture C, the output of the additional picture E includes only the high frequency components E after eliminating the frequency components of the picture D from the frequency components of the picture C shown in FIG. 2A.

Figure 14:
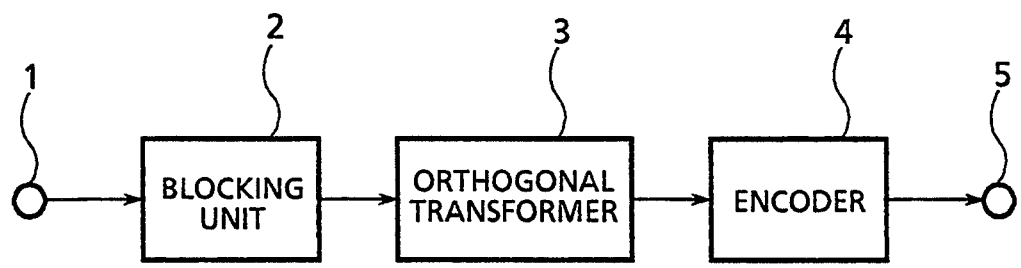
FIG. 14 is a block diagram for showing a prior-art encoder of a video signal.

When the picture C is divided into the picture D and the additional picture E in the manner as described above, in encoding a picture in any one of the modes of the pictures A, B and C selected by the first and second switches 40 and 41, an input picture A, B or D to the first encoding circuit 50 has the number of horizontal pixels $H_1$ and the number of vertical pixels $V_1$. Therefore, regardless of the mode of encoding, the first encoding circuit 50 produces the encoded signal X having the same data quantity by the same processing and at the same compression ratio. The first encoding circuit 50 itself can execute the encoding processing according to the orthogonal transformation as described previously with FIG. 14.

On the other hand, the second encoding circuit 51 encodes the additional picture E which is structured by only the high frequency components in the picture C, and produces the encoded signal Y. The encoding processing of the second encoding circuit 51 may of course be the same as the first encoding circuit 50. However, the additional picture E does not have the frequency components included in the picture D and, therefore, has little influence to the visual sense of a human being. In other words, the additional picture E includes only high frequency components of which deterioration is not easily visually recognized comparing to low frequency components. Therefore, the compression rate in the second encoding circuit 51 may be higher than that in the first encoding circuit 50. Alternatively, the encoding processing may be done by a separate processing such as a predictive coding instead of the processing by orthogonal transformation.

Next, description will be made of a decoding apparatus which retrieves the original pictures A, B and C from the encoded signals X and Y encoded by the encoding apparatus of the present embodiment.

The block diagram in FIG. 7 shows an example of the configuration of the decoding apparatus. In FIG. 7, numeral 160 designates an input terminal of a decoded signal X, 161 designates an input terminal of a decoded signal Y, 150 designates a first decoding circuit which performs an inverse processing of the first encoding circuit 50 to decode the encoded signal X, for obtaining pictures A', B' and D' which are decoded pictures of the pictures A, B and D respectively, and 151 designates a second decoding circuit which performs an inverse processing of the second encoding circuit 51 to decode an encoded signal Y, for obtaining an additional picture E' which is a decoded picture of an additional picture E. 130 designates a decoding interpolating circuit for interpolating the output of the decoding circuit 150 into a picture having the same number of pixels as that of the picture C. 133 designates an adder circuit for adding an output of the decoding interpolating circuit 130 to the output of the second decoding circuit 151. 110 designates an output terminal for providing an output of the first decoding circuit 150 as the picture A', 111 designates an output terminal for providing an output of the first decoding circuit as the picture B', and 112 designates an output terminal for providing an output of the adder circuit 133 as the picture C' which is a decoded picture of the picture C. The decoding interpolating circuit 130 is structured by the vertical interpolating circuit 31 and the horizontal interpolating circuit 32 which also structure the differential circuit 30 in FIG. 3. Therefore, the decoding interpolating circuit 130 in the decoding apparatus may be commonly used to the differential circuit 30 in the encoding apparatus when the adder circuit 133 replaces the subtraction function of the subtracting circuit 33 of the differential circuit 30 with the addition function.

As described above, in the configuration of the encoding apparatus shown in FIGS. 2A and 2B and the configuration of the decoding apparatus shown in FIG. 7, the first encoding circuit 50 of the encoding apparatus and the first decoding circuit 150 of the decoding apparatus are common structure elements and are exactly the same circuits for all the modes of the pictures A, B and C. Other structure elements excluding the switches are the circuits which are necessary in only the mode of the picture C. Accordingly, a signal which has been encoded in the mode of the picture C can also be decoded by an exclusive decoding apparatus for picture A or B. In other words, when the picture C is encoded by the encoding apparatus of the present embodiment, not only the picture C' can be obtained by the decoding apparatus shown in FIG. 7, but also the picture A' or B' can also be obtained from only the encoded signal X by the exclusive decoding apparatus exclusive for picture A or B having only the first decoding circuit 150. Inversely, when a picture is encoded by the exclusive encoding apparatus for picture A or B which is structured by only the first encoding circuit 50, the encoding circuit can produce an output as the picture C' assuming that the encoded signal Y in FIG. 7 has no information.

As explained above, according to the present embodiment, the first encoding circuit 50 is a structure element common to all the modes of the pictures A, B and C, requiring no additional separate circuit in each mode, and the encoded data of any one of these input pictures can be decoded by any decoding apparatus.

Figure 4A:
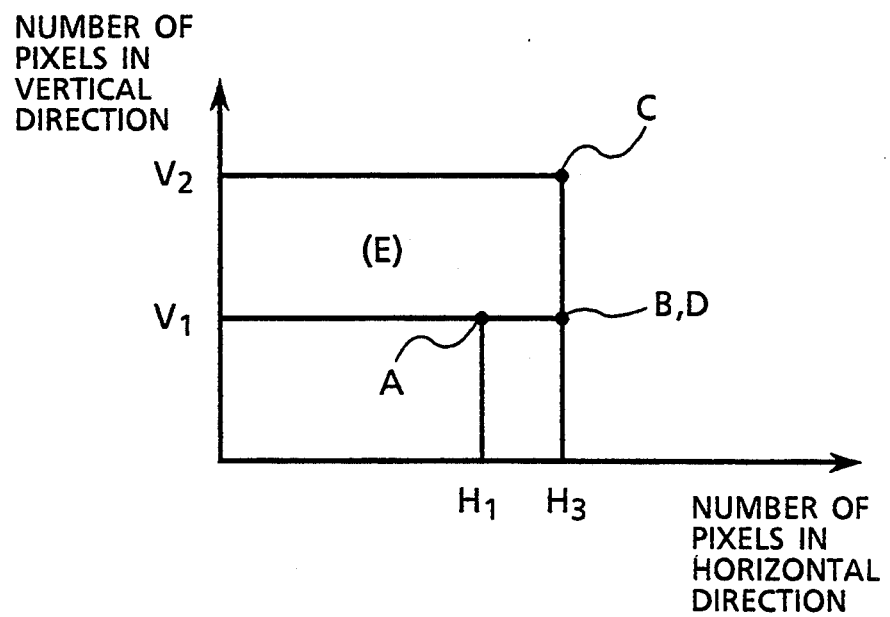
FIG. 4A is a relational diagram described in coordinates showing the relationship between numbers of horizontal and vertical pixels of input pictures in the second embodiment of the present invention.
Figure 4B:
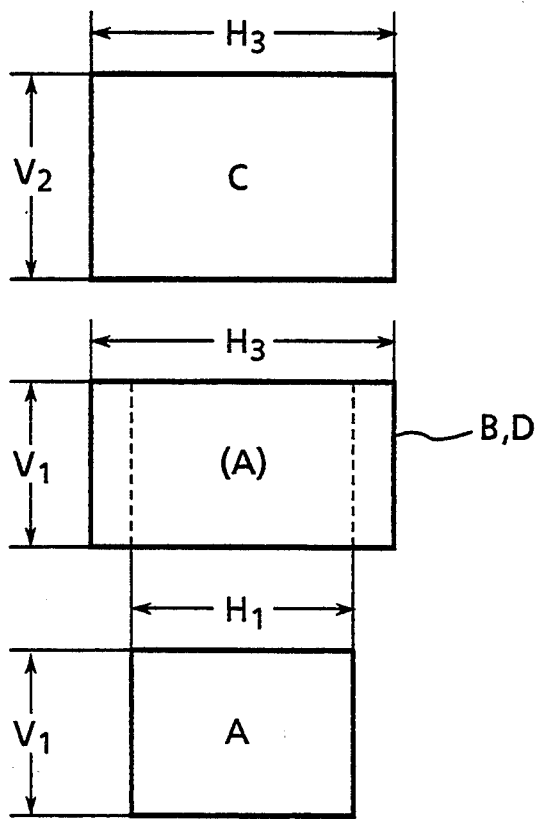
FIG. 4B is a relational diagram for showing the respective input pictures in the second embodiment of the present invention.
Figure 5:
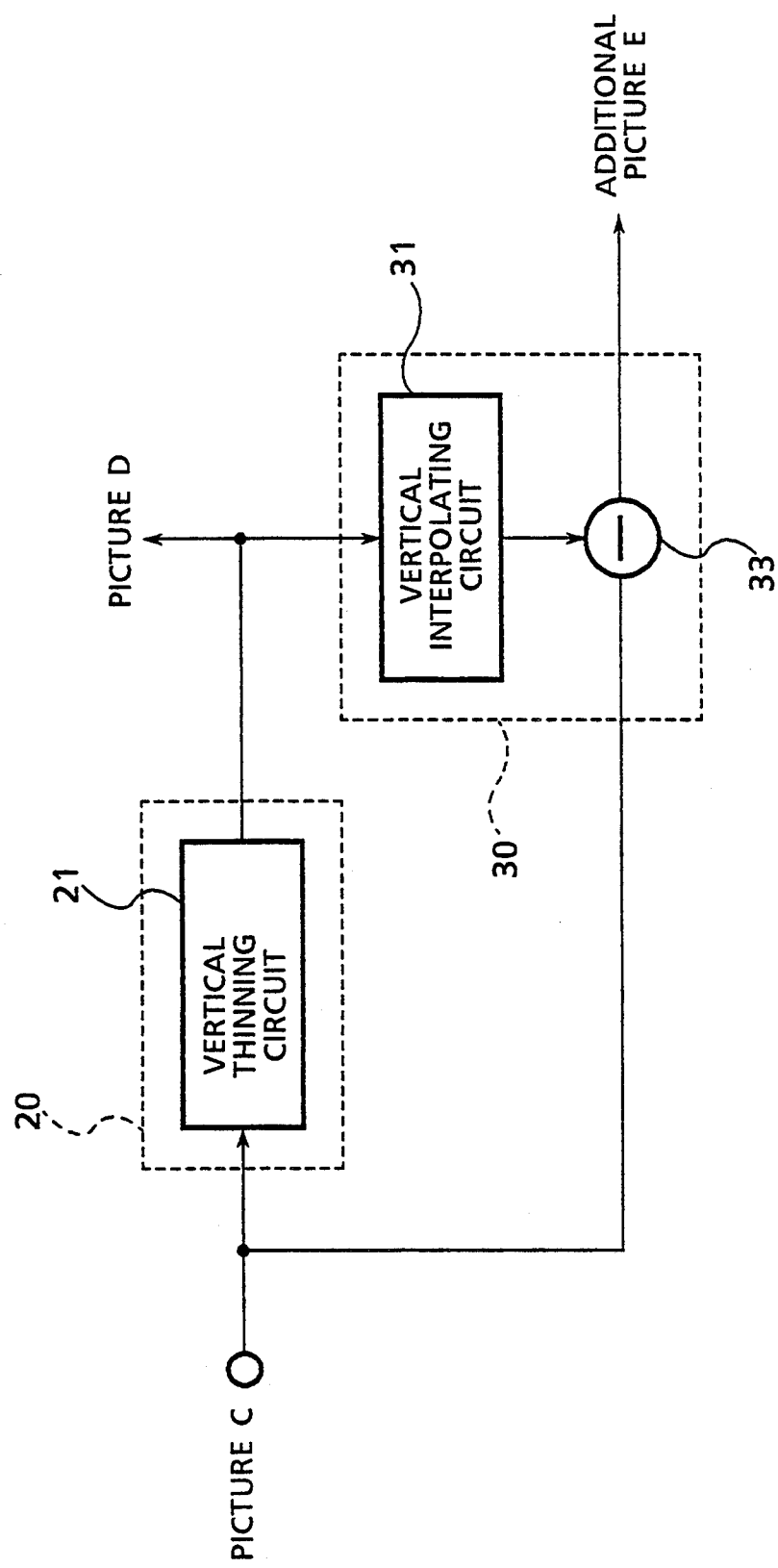
FIG. 5 is a block diagram for showing a configuration of a band limiting circuit and a differential circuit which are structural elements of the encoding apparatus according to the second embodiment of the present invention.

The encoding apparatus according to a second embodiment of the present invention will be explained below. A block diagram of the total configuration of the present embodiment may be described as the same as the configuration of the first embodiment, and therefore, is omitted. The second embodiment is different from the first embodiment in the relationship between the numbers of horizontal and vertical pixels for the pictures A, B and C and the corresponding structures of the band limiting circuit 20 and the differential circuit 30. FIGS. 4A and 4B show the relationship between the numbers of horizontal and vertical pixels of the pictures A, B and C respectively in the present embodiment, and FIG. 5 shows a structure block diagram of the band limiting circuit 20 and the differential circuit 30.

First, numbers of horizontal and vertical pixels and their bands of corresponding pictures in the present embodiment will be explained with reference to FIGS. 4A and 4B. In the first embodiment, the picture B has the horizontal to vertical screen frame ratio of 16:9 which gives a wider screen than that of the picture A, through the picture B has the same number of horizontal pixels as that of the picture A. In decoding the encoded data of the picture B by the decoding apparatus exclusive for the mode of the picture A and displaying the decoded picture on a display unit of the horizontal to vertical screen frame ratio of 4:3, the number of horizontal pixels becomes smaller, or the band is narrower, than that of the data which is a result of encoding the picture A, if the decoded picture is to be displayed by keeping the number of the vertical pixels to be the same as that of the picture A. On the other hand, when the decoded picture is to be displayed by keeping the number of the horizontal pixels to be the same as that of the picture A, the number of the vertical pixels needs to be reduced to display the vertical areas of the display screen only in the mode of letter box by no signal in upper and lower end portions in the screen. To solve this problem, in the present embodiment, as shown in FIG. 4B, the number of the horizontal pixels of the picture B is $H_3$ which is larger than the number $H_1$ of the horizontal pixels of the picture A and the number of the horizontal pixels of the picture C is $H_3$ which is the same as that of the picture B, although the horizontal to vertical screen frame ratio of the picture A is 4:3 and the horizontal to vertical screen frame ratio of the pictures B and C is 16:9, which remain the same as the case of the first embodiment. This $H_3$ is resulted from increasing the number of pixels corresponding to a wider screen having the horizontal to vertical screen frame ratio of 16:9 for the picture B changed from the ratio of 4:3 for the picture A. In other words, $H_1$:$H_3$ becomes the ratio of 3:4 and $H_3$ is 4/3 of the size of $H_1$. With the above arrangement, a partial picture which is the portion of $H_1$ extracted from the horizontal pixels numbered $H_3$ of the picture B has the horizontal to vertical screen frame ratio of 4:3, having exactly the same numbers of the horizontal and vertical pixels as the picture A. Therefore, the encoded data X which is a result of encoding a picture in the mode of the picture B can be decoded by the decoding apparatus exclusive for the mode of the picture A and can be displayed without narrowing the horizontal band if only the number of $H_1$ of the horizontal pixels are used. A detailed configuration of the first encoding circuit which can be compatibly used for the picture A and the picture B has been applied for a patent by the present applicant under the Japanese Patent Application No. H3-15191.

The picture C has the number $V_2$ of vertical pixels which is larger than the number $V_1$ of vertical pixels of the picture B and has the number $H_3$ of horizontal pixels which is the same as that of the picture B. In order to obtain the picture D, a bit rate reducing circuit 20 shown in FIG. 5 needs to have a structure of only the vertical thinning circuit 21, and similarly, the differential circuit 30 needs to have a structure of only the vertical interpolating circuit 31 and the subtracting circuit 33. Also in the decoding apparatus, the decoding interpolating circuit 130 in FIG. 7 can be structured by only the vertical interpolating circuit 31.

As explained above, according to the present embodiment, the first encoding circuit 50 is a structure element common to all the pictures A, B and C, and encoded data of any one of these input pictures can be decoded by any decoding apparatus. Further, the number of the horizontal pixels of the picture B having the horizontal to vertical screen frame ratio of 16:9 is larger than the number of the horizontal pixels of the picture A having the horizontal to vertical screen frame ratio of 4:3, so that the encoded data of the picture B includes the data of the picture A without any shortage and the picture B can be effectively displayed on the display having the horizontal to vertical screen frame ratio of 4:3, without narrowing the horizontal band components.

Figure 6A:
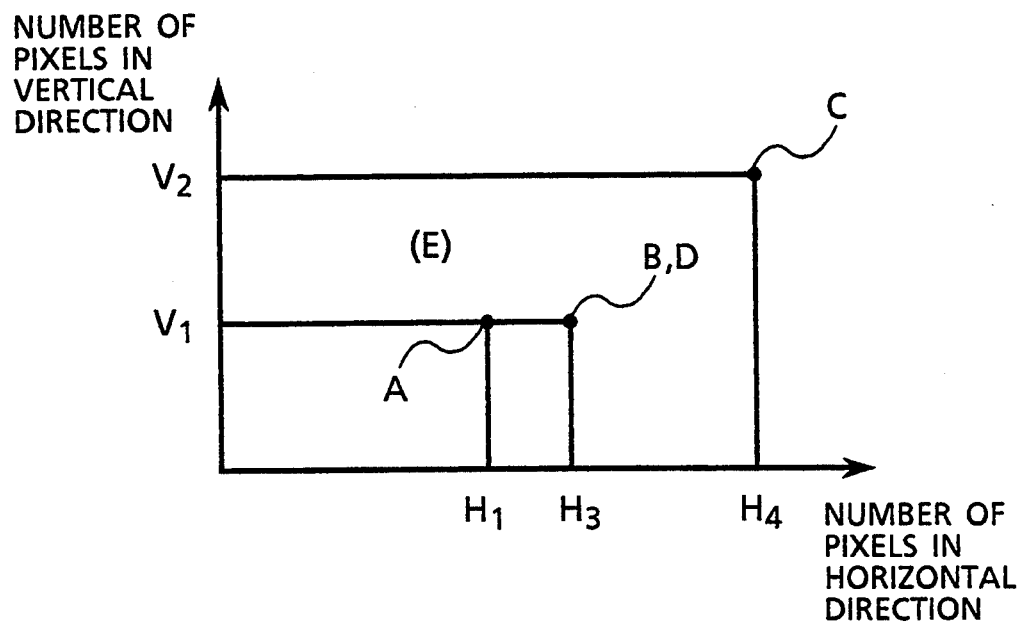
FIG. 6A is a relational diagram described in coordinates showing a relationship between numbers of horizontal and vertical pixels of input pictures in the third embodiment of the present invention.
Figure 6B:
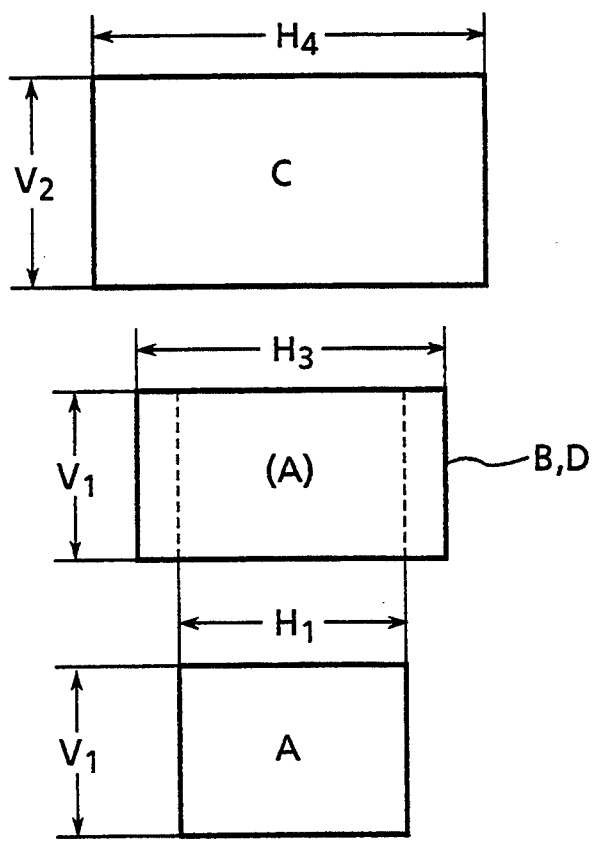
FIG. 6B is a diagram for showing the respective input pictures in the third embodiment of the present invention.

The encoding apparatus of a third embodiment of the present invention will be explained below. A block diagram of the configuration of the third embodiment is the same as the configuration of the first and second embodiments, and is therefore emitted. The third embodiment is different from the first and second embodiments in the relationship between the numbers of horizontal and vertical pixels of the pictures A, B and C. FIGS. 6A and 6B show the relationship between the numbers of horizontal and vertical pixels for the pictures A, B and C.

Numbers of horizontal and vertical pixels of the pictures and their bands in the present embodiment will be explained with reference to FIGS. 6A and 6B. The pictures A and B of the third embodiment are the same as those in the second embodiment. The third embodiment is different from the second embodiment in that the number of the horizontal pixels of the picture C is $H_4$ which is larger than the number of the horizontal pixels $H_3$ for the picture B. Therefore, the band limiting circuit 20 and the differential circuit 30 of the third embodiment have the thinning circuits and interpolating circuits in the vertical direction and the horizontal direction respectively, in the same manner as shown in FIG. 3. However, the thinning rate in the horizontal thinning circuit 22 is $H_3/H_4$.

The band of the picture C as shown in the present embodiment will be explained below. The picture C corresponds to the high-definition television signal as described above, and the luminance signal for a broadcasting transmission band has the frequency of about 30 MHz. The luminance signal for the home use is recommended to have a band of about 20 MHz. On the other hand, the standard television signal, which corresponds to the picture A according to the present invention, has the frequency of about 6 MHz for broadcasting. Therefore, the band of the picture B of the present embodiment is 4/3 of about 6 MHz, that is about 8 MHz. Considering from the number of scanning lines of 1125 lines for one frame of the high-definition television signal currently scheduled for the satellite broadcasting as the so-called high-vision TV and 525 lines for the standard television signal, the picture C for a high-definition television signal requires about two times of the number of the vertical pixels of the picture A used for a standard television signal, or the picture B for a wide television signal. From the above relationship of the transmission band and the number of scanning lines, the picture C requires about two times of the number of vertical pixels of the picture B and about two times of the number of horizontal pixels of the picture B if the picture C is transmitted in the transmission band of the high-definition television signal for broadcasting. Similarly, the picture C requires about two times of the number of vertical pixels of the picture B and about 1.25 time of the number of horizontal pixels of the picture B if the picture C is transmitted in the transmission band for home use. Accordingly, when the high-definition television signal of the frequency 30 MHz or 20 MHz is used for the picture C, the above-described relationship of the numbers of horizontal and vertical pixels exists and this relationship can be obtained by the present embodiment.

The encoded data X and the data quantity in the present embodiment will be explained next. Based on the above explanation of the numbers of pixels, the data quantity of the additional picture E becomes about 2.5 time of the picture B when the picture C is a high-definition television signal of the frequency 20 MHz. However, the band components included in the picture D which have the same band as the picture B is excluded from the additional picture E at the beginning. Accordingly, the quantity of information included in the additional picture E is about 1.5 time of that of the picture B. However, the higher frequency components have less influence on pictures in the sense of sight as described above. Therefore, the additional picture E may be processed at a higher compressing rate than that applied to the picture D which consists of lower frequency components of the picture. Accordingly, although the quantity of information of the additional picture E is about 1.5 time of that of the picture D, the additional picture E can be encoded at the compressing rate with additional $\frac{2}{3}$ time of the compressing rate of the picture D to make the quantity of the encoded data X exactly the same as the quantity of the data Y. When the encoding apparatus which makes the encoded data X to be the same as the data Y is utilized for a video tape recorder, for example, the picture C can be recorded by a double channel recording of the picture A or picture B because the data quantity of the mode of the picture C is just two times of the data quantity of the mode of the picture A or picture B. The compatibility of the recording pattern is also good in this case. When the picture C is to be used as a high-definition television signal of the frequency about 30 MHz, the quantity of information of the additional picture E becomes about three times of the quantity of information of the picture D. When the picture E is encoded at the compressing rate with $\frac{2}{3}$ of the compressing rate of the picture D, the data quantity of the encoded data Y corresponds to just two times of the data quantity of the encoded data X. Accordingly, when this encoding apparatus is used for a video tape recorder, it is possible to record with three-time channel recording of the picture A or picture B, with a satisfactory compatibility.

As explained above, according to the third embodiment, the encoding apparatus of the present embodiment can encode a high-definition television signal of a very wide frequency range in the same manner as the recording of a standard television signal or a wide television signal. Further, data which has been obtained by encoding a high-definition television signal can be decoded even by the decoding apparatus exclusive for a standard television signal, by using a part of the decoded data, or the decoded data X.

When the encoding apparatus of the present invention is utilized for a video tape recorder, a high-definition television signal recorded on a tape can be completely reproduced as a standard television signal by a video tape recorder exclusive for a standard television signal, so that the tape can be compatibly used with high efficiency.

In the above description of each embodiment, the configurations of the band limiting circuit 20 and the differential circuit 30 shown in FIGS. 3 and 5 respectively are used to set the numbers of the horizontal and vertical pixels of the additional picture E to the same as those of the picture C respectively so that the additional picture E is encoded by the second encoding circuit 51. Since the additional picture E does not include the low frequency components corresponding to those of the picture D as described above, the number of the pixels to be processed may be less than that of the original picture C. For example, in the second embodiment explained above, the additional picture E includes only the components shown by E in FIG. 4A. Therefore, in this case, the number of vertical pixels may be $V_2-V_1$ and the pixels may be thinned by limiting the band such that the high frequency components in the vertical direction are extracted. When horizontal high frequency components are included in the additional picture E as shown in the first and second embodiments, the similar processing is further carried out in the horizontal direction.

The frequency of the picture C has been explained above as 30 MHz or 20 MHz for a high-definition television signal in the explanation of the encoding apparatus of the present invention. However, the frequency may change, as a matter of fact, depending on the sampling frequency for sampling the high-definition television signal. In this case, the numbers of the horizontal and vertical pixels of the picture C respectively are determined by the number of sampling frequencies, and therefore, the thinning and interpolating rate to the picture D may be determined according to the numbers of the horizontal and vertical pixels respectively.

According to the above encoding apparatus of the present invention, two kinds of encoded data, the encoded data X and Y are produced. As is clear from the explanation of each embodiment, the encoded data Y is the data necessary in only the mode for encoding the picture C. Accordingly, only the first encoding apparatus 50 can structure the encoding apparatus exclusive for the mode of the picture A or picture B and only the first decoding apparatus 150 can structure the decoding apparatus exclusive for the mode of the picture A or picture B. Therefore, an encoding and decoding apparatus which can correspond to the picture C can be structured by adding to these exclusive encoding and decoding apparatuses, the second encoding apparatus, the second decoding apparatus, the band limiting circuit 20, the differential circuit 30, the interpolating circuit 130 for decoding, the adder circuit 133 and the switches.

Figure 8:
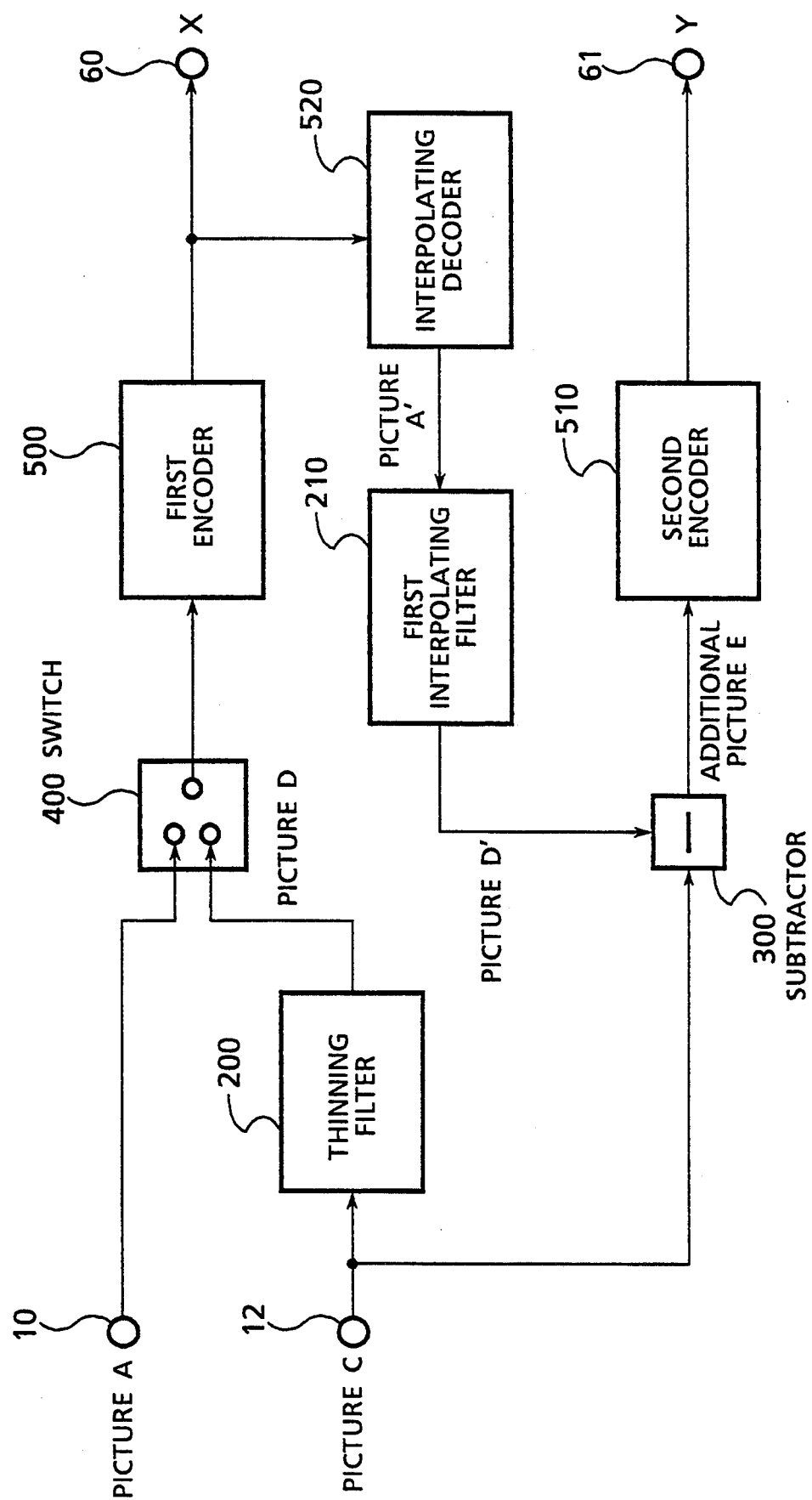
FIG. 8 is a block diagram for showing a configuration of an encoder in the fourth embodiment of the present invention.

FIG. 8 is a block diagram for showing a configuration of the encoding apparatus according to a fourth embodiment of the present invention. In FIG. 8, 10 designates an input terminal for inputting a picture A of which horizontal to vertical screen frame ratio is 4:3 or 16:9, and 12 designates an input terminal for inputting a picture C of which horizontal to vertical screen frame ratio is 16:9. 200 designates a thinning filter for limiting the band of the picture C to obtain a picture D having the same numbers of horizontal and vertical pixels as those of the picture A respectively, and 400 designates a switch for outputting the picture A in the mode for encoding the picture A and for outputting the picture D in the mode for encoding the picture C. 500 designates a first encoder for high-efficiency encoding an output of the switch 400 to output an encoded signal X, and 520 designates a decoder used in interpolating for decoding the encoded signal X. 210 designates a first interpolating filter for interpolating an output of the decoder 520 to obtain a picture D' having the same numbers of horizontal and vertical pixels as those of the picture C respectively. 300 designates a subtractor for obtaining an additional picture E which is a difference between the picture C and the picture C'. 510 designates a second encoder for high-efficiency encoding the additional picture E to output an encoded signal Y, 60 designates an output terminal for outputting the encoded signal X, and 61 designates an output terminal for outputting the encoded signal Y.

FIG. 9 is a block diagram for showing a configuration of the decoding apparatus according to the fourth embodiment of the present invention. In FIG. 9, 160 designates an input terminal for the encoded signal X, and 161 designates an input terminal for the encoded signal Y. 600 designates a first decoder which is the same as the decoder 520 for carrying out an inverse processing of the first encoder 500, for decoding the encoded signal X to obtain a picture A' which is a reproduced picture of the pictures A and D, and 610 designates a second decoder for carrying out an inverse processing of the second encoder 510, for decoding the encoded signal Y to obtain an additional picture E' which is a reproduced picture of the additional picture E. 211 designates a second interpolating filter which is the same as the first interpolating filter 210, for interpolating the picture A' to obtain a picture D'. 310 designates an adder for adding the additional picture E' and the picture D' to obtain a picture C' which is a reproduced picture of the picture C. 120 designates an output terminal for outputting the picture A' and 121 designates an output terminal for outputting the picture C'.

Figure 10A:
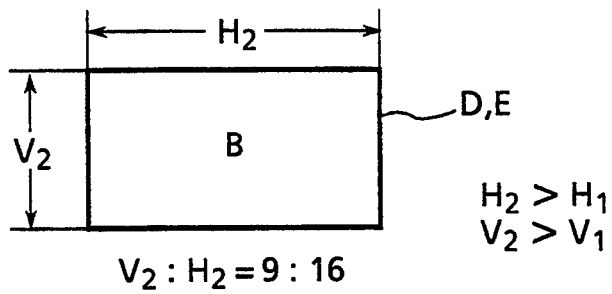
FIG. 10A is a diagram for showing an input picture in a standard television signal having a vertical to horizontal screen frame ratio of 9:16 in the fourth embodiment of the present invention.
Figure 10B:
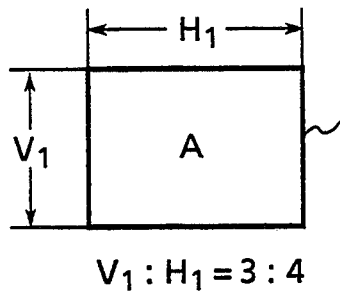
FIG. 10B is a diagram for showing an input picture in a standard television signal having a vertical to horizontal screen frame ratio of 3:4 in the fourth embodiment of the present invention.
Figure 10C:
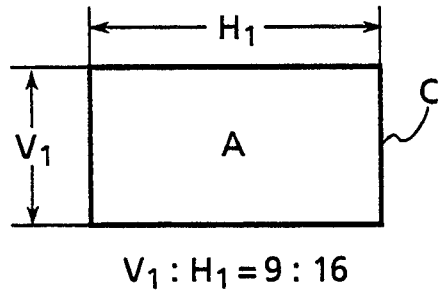
FIG. 10C is a diagram for showing an input picture in a high-definition television signal in the fourth embodiment of the present invention.

FIGS. 10A, 10B and 10C are diagrams showing the relationship of the numbers of horizontal and vertical pixels of the pictures A and C for explaining the operation of the present embodiment. The operation of the encoding apparatus and the decoding apparatus shown in FIGS. 8 and 9 respectively will be explained with reference to FIGS. 10A, 10B and 10C.

As shown in FIGS. 10A, 10B and 10C, assume $H_2 > H_1$ and $V_2 > V_1$ where $H_2$ and $V_2$ designate the numbers of the horizontal and the vertical pixels of the picture C respectively, $H_1$ and $V_1$ designate the numbers of the horizontal and vertical pixels of the picture A respectively. The picture C is a high-definition television signal having the horizontal to vertical screen frame ratio of 16:9. The picture A is a standard television signal with the horizontal to vertical screen frame ratio of 4:3 or a wide version of a standard television signal with the horizontal to vertical screen frame ratio of the picture A is 16:9.

From the relationship shown in FIGS. 10a, 10B and 10C, the thinning filter 200 limits the band of the picture C in the horizontal direction to $H_1/H_2$ and limits the band in the vertical direction to $V_1/V_2$. After limiting the band as described above, the thinning filter 200 thins the pixels to produce the picture D which has the same numbers of the horizontal and vertical pixels respectively of the picture A. Accordingly, regardless of the mode of the switch 400, the first encoder 500 outputs the encoded signal X of the same quantity of data by exactly the same processing at the same compressing ratio. The processing of the first encoder 500 may be the encoding processing according to the orthogonal transformation explained in FIG. 14.

The interpolating filter 210 receives the reproduced signal A' of the picture D to interpolate the number of the thinned pixels of the picture A' and produces an output of the picture D' which has the same numbers of the horizontal and vertical pixels $H_2$ and $V_2$ respectively as those of the picture C. Since the picture D' is obtained as a result of the thinning and interpolating processings, the picture D' has a narrower band than the picture C. Further, since the picture D' is obtained after the encoding and decoding processings, errors due to these processings are also included in the picture D'. Accordingly, when the picture D' is subtracted from the picture C by the subtractor 300, the additional picture E which is the output of the subtractor 300 is a signal which consists of the high frequency components obtained after subtracting the frequency components of the picture D' from the frequency components of the picture C and the error components generated as a result of the encoding and decoding processings.

In the meantime, the second encoder 510 encodes the additional picture E and produces an output of the encoded signal Y. The encoding processing by the second encoder 510 may of course be the same as that of the first encoder 500. However, since the additional picture E does not include the low frequency components which influence greatly to the visual sensation of the human being, the compressing ratio in the second encoder 510 may be higher than the compressing ratio of the first encoder 500. Further, the encoding processing of the second encoder 510 may be any adequate encoding processing such as predictive encoding as well as the processing by the orthogonal transformation.

Further, the picture D' which is the output of the interpolating filter 211 in the decoding apparatus shown in FIG. 9 becomes the same signal as the output of the interpolating filter 210, so that the error components included in the picture D' are cancelled from the picture C' which is the output of the adder 310. Accordingly, the error components included in the picture C' are only those error components which occur due to the processings by the second encoder 510 and the second decoder 610. From the above facts, errors due to the compressing of the additional picture E can be minimized and the picture quality of the picture C' can be eventually improved, by having the relation of $Dx > Dy$, where $Dx$ designates the data quantity of the encoded signal x outputted from the first encoder 500 and Dy designates the data quantity of the encoded signal Y outputted from the second encoder 510.

In the above-described encoding apparatus shown in FIG. 8 and the decoding apparatus shown in FIG. 9, the first encoder 500 and the first decoder 600 are the common structure elements for both modes of the pictures A and C, and they are exactly the same circuits in both of these modes. The rest of structure elements are the circuits which are necessary only in the mode of the picture C. Accordingly, a signal encoded in the mode of the picture C can also be decoded by the decoding apparatus exclusive for the mode of the picture A. In other words, when the picture C is encoded by the encoding apparatus of the present embodiment, the picture C' can be obtained by the decoding apparatus shown in FIG. 9, and the picture A' can also be obtained by the decoding apparatus exclusive for the mode of the picture A which has only the first decoder 600, by using only the decoded signal X. Inversely when the picture C is encoded by the encoding apparatus exclusive for the mode of the picture A which is structured by only the first encoder 500, the decoding apparatus can produce an output as the picture C' in the case that the decoded signal Y as an input of the second decoder has no information.

As explained above, according to the present embodiment, the first encoder 500 and the first decoder 600 are common structure elements commonly used for the pictures A and C, and it is not necessary to structure different circuits for both modes. An encoded signal of any one of these input signals can be decoded by any decoder.

An encoding and decoding apparatus according to a fifth embodiment of the present invention will be explained below.

Figure 11A:
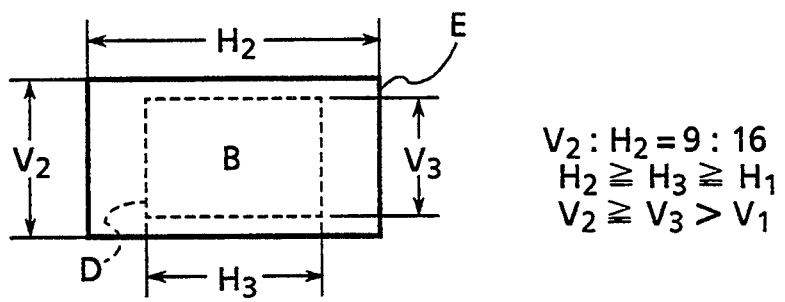
FIG. 11A is a diagram for showing an input picture in a standard television signal having a vertical to horizontal screen frame ratio of 9:16 in a fifth embodiment of the present invention.
Figure 11B:
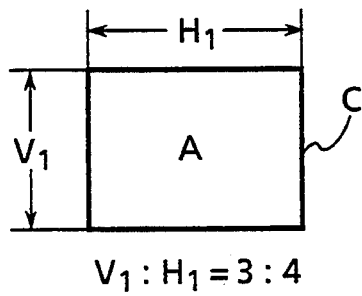
FIG. 11B is a diagram for showing an input picture in a standard television signal having a vertical to horizontal screen frame ratio of 3:4 in the fifth embodiment of the present invention.
Figure 11C:
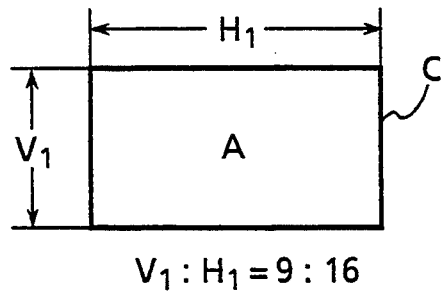
FIG. 11C is a diagram for showing an input picture in a high-definition television signal in the fifth embodiment of the present invention.

A block diagram of the configuration of the present invention is the same as that of the fourth embodiment, and is therefore emitted. The present embodiment is different from the fourth embodiment in the method of thinning the picture C. An example configuration of the second encoder 510 for the present embodiment will be explained. FIGS. 11A, 11B and 11C show the relationship between the numbers of horizontal and vertical pixels for the pictures A and C respectively in the present embodiment. FIG. 12 shows a block diagram of a configuration of one embodiment of the second encoder 510, and FIG. 13 shows a conceptional diagram of the signal used for explaining the operation of the second encoder 510.

Numbers of horizontal and vertical pixels of pictures in the present embodiment will be explained with reference to FIGS. 11A, 11B and 11C. The pictures A and C have the relationship of $H_2 > H_1$ and $V_2 > V_1$ similar to the pictures in the fourth embodiment. The picture C is a high-definition television signal, and the picture A is either a standard version or a wide version of the standard television signal.

The thinning filter 200 inputs the area of the picture C with the number of horizontal pixels $H_3$ and the number of vertical pixels $V_3$ shogun in FIGS. 11A, 11B and 11C. The relationship between the numbers of the pixels is $H_2 \geq H_3 \geq H_1$ and $V_2 \geq V_3 > V_1$. The picture D which is the output of the thinning filter 200 is obtained from the picture C by limiting the band of the area shown by a broken line to $H_1/H_3$ in the horizontal direction and $V_1/V_3$ in the vertical direction and then thinning the pixels from the picture C. In other words, in the above relationship, the broken line portion in the picture C is displayed when the encoded signal X of the picture C is decoded by the decoding apparatus exclusive for the mode of the picture A. Accordingly, when the horizontal to vertical screen frame ratio of the picture A is 4:3, the ratio of $H_3$ to $V_3$ is set to $H_3:V_3 \cong 4:3$, and when the horizontal to vertical screen frame ratio of the picture A is 16:9, the ratio of $H_3$ to $V_3$ is set to $H_3:V_3 \cong 16:9$, so that a picture free from vertical expanding or horizontal expanding can be obtained on the screen of the decoding apparatus exclusive for the picture A.

The picture D which is the output of the thinning filter 200 is obtained from the picture C by thinning the dotted line area with the number of horizontal pixels $H_3$ and the number of vertical pixels $V_3$ shown in FIGS. 11a, 11B and 11C, so that the picture D' which is the output of the interpolating filter 210 has the size having the number of horizontal pixels $H_3$ and the number of vertical pixels $V_3$. The subtracter 300 subtracts the picture D' from the picture C, and therefore the additional picture E is different from the one obtained in the fourth embodiment. The additional picture E has the area inside the dotted line of the picture C, shown in FIGS. 11a, 11B and 11C, as a signal consisting of the high frequency components obtained by subtracting the frequency components of the picture D' from the frequency components of the picture C, and error components generated as a result of encoding and decoding processings, and the rest of the area around the dotted line remains the signal of the picture C as it is.

The second encoder 510 is the same as that in the fourth embodiment and has no problem. As a more efficient method, the second encoder shown in FIG. 12 will be explained. In FIG. 12, 511 designates an input terminal for inputting the additional picture E, 512 designates a blocking circuit for putting the input signal into blocks of a predetermined size, and 513 designates an orthogonal transformer for performing an orthogonal transformation to the blocks. 514 designates an encoder, 516 designates a quantizer for quantizing the blocks after the orthogonal transformation, 517 designates a quantizing selecting circuit for controlling the quantity of quantizing, 518 designates an encoding circuit for allocating encoded words to a quantized signal, and 515 designates an output terminal for outputting an encoded signal.

Figure 13A:
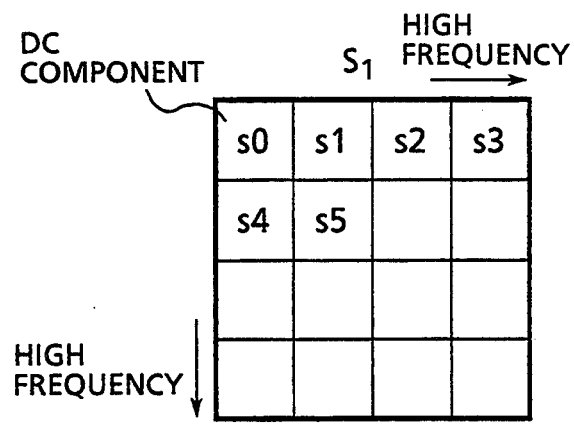
FIG. 13A is a conceptional diagram of an output signal of an orthogonal transformer of the second encoder in the fifth embodiment of the present invention.
Figure 13B:
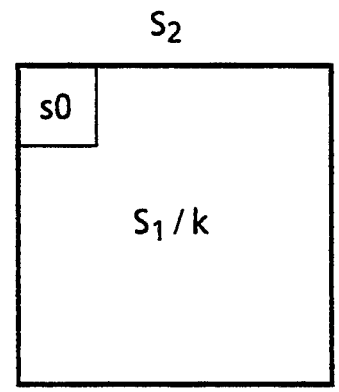
FIG. 13B is a conceptional diagram of an output signal of a quantizer of the second encoder in the fifth embodiment of the present invention.
Figure 13C:
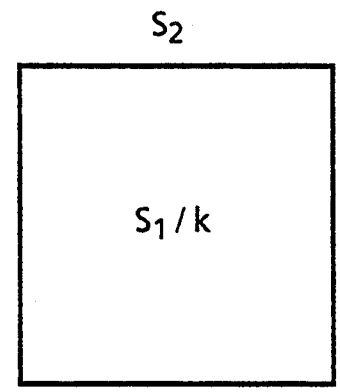
FIG. 13C is a conceptional diagram of an output signal in another state of the quantizer of the second encoder in the fifth embodiment of the present invention.

In putting the additional picture E to be inputted to the blocking circuit 512 for blocking, a control signal is inputted to the quantizer 516 to define whether the blocks are for the picture C itself or the difference between the picture C and the picture C'. Assume that the output blocks of the quantizer 516 have the size of $4 \times 4$, for example. Then, the orthogonal transformer 513 which receives the block signal produces an output signal $S_1$ expanding in two dimension from the low frequency to the high frequency, with s0 as a DC component, as shown in FIG. 13A. The DC component s0 shows an average level of the blocks, and when the blocks are for the picture C itself a variety of cases exist. When the blocks are for the differential components, the DC component s0 becomes a small value in many cases. Accordingly, the quantizer 516 can process the blocks by handling the DC component s0 as the data as it is when the blocks are for the picture C itself, and the quantizer 516 can quantize the blocks as the AC components other than the DC component s0 when the blocks are for the differential components, so that the efficiency of encoding can be improved. FIG. 13B shows an output signal s2 of the quantizer 516 after the blocks of the picture C itself have been processed, where the components other than the DC component s0 have been quantized by a quantizing coefficient k determined by the quantizing selecting circuit 517. FIG. 13C shows an output signal s2 of the quantizer 516 after processing the blocks of the differential components between the picture C and the picture D', where all the components including the DC component s0 have been quantized by the quantizing coefficient k. It is needless to mention that there are two ways of decoding when the second decoder 610 is used.

As explained above, according to the present embodiment, the first encoder 500 and the first decoder 600 are common structure elements for the picture A and the picture C, and an encoded signal of any one of these input pictures can be decoded by any decoding apparatus. Further, the picture D obtained by the thinning filter 200 can be matched to the horizontal to vertical screen frame ratio of the picture A, so that it is possible to avoid an unnatural ratio of the horizontal to vertical screen frame appearing on the screen when the encoded signal of the picture C is decoded in the mode of the picture A.

Further, the first decoder 600 and the second interpolating filter 211 which are the structure elements of the decoding apparatus in each of the above embodiments can be shared with the decoder 520 and the first interpolating filter 210 of the encoding apparatus.

The second encoder 500 in the fifth embodiment can also be used in the fourth embodiment, and the second encoder 500 can also be used in the structure for obtaining the picture D' by directly interpolating the picture D instead of encoding and decoding the picture D.

Further, the numbers of the horizontal pixels $H_1$ and $H_2$ of the picture A and the picture C respectively in each of the embodiments are determined by the sampling frequency of each picture. Therefore, thinning and interpolating processings in the horizontal direction are not necessary when the relationship of $H_2=H_1$ or $H_3=H_1$ exists.

We claim:

1. An encoding apparatus for a video signal, comprising:
    input terminals for inputting a picture A having a horizontal to vertical screen frame ratio of 4:3, a picture B for a wide screen having a larger horizontal to vertical screen ratio than the picture A and a picture C having a larger number of vertical pixels than that of the picture A and the picture B with the same horizontal to vertical screen frame ratio as that of the picture B, and
    band limiting means for limiting band of the picture C to obtain a picture D having the same numbers of horizontal and vertical pixels as those of the picture B;
    differential means for obtaining a difference between the picture C and the picture D to have an additional picture E;
    first encoding means for high-efficiency encoding the picture A, the picture B and the picture D; and
    second encoding means for high-efficiency encoding the additional picture E.

2. An encoding apparatus according to claim 1, wherein data quantity of encoded data obtained by said second encoding means is equal to or greater than the data quantity of encoded data obtained by said first encoding means.

3. An encoding apparatus according to claim 1, wherein the number of horizontal pixels of the picture B is equal to the number of horizontal pixels of the picture A.

4. An encoding apparatus according to claim 1, wherein the number of horizontal pixels of the picture B is larger than the number of horizontal pixels of the picture A.

5. An encoding apparatus according to claim 1, wherein the number of horizontal pixels of the picture C is equal to the number of horizontal pixels of the picture B.

6. An encoding apparatus according to claim 1, wherein the number of horizontal pixels of the picture C is larger than the number of horizontal pixels of the picture B.

7. An encoding apparatus according to claim 3, wherein said first encoding means performs exactly the same high-efficiency encoding for the picture A, B and D respectively.

8. An encoding apparatus according to claim 4, wherein said first encoding means performs exactly the same high-efficiency encoding as that of the picture A for a portion within the horizontal pixels of the pictures B and D respectively, the portion having the same number of horizontal pixels as the picture A.

9. An encoding apparatus according to claim 1, wherein the quantity of encoded data obtained by said second decoding means is an integral multiple of the data quantity of encoded data obtained by said first encoding means.

10. An encoding apparatus for a video signal, comprising:
    input terminals for inputting a picture A and a picture C having a larger number of vertical pixels than the number of vertical pixels of the picture A;
    a thinning filter for limiting band of the picture C to obtain a picture D having the same numbers of horizontal and vertical pixels respectively as those of the picture A;
    first encoding means for high-efficiency encoding the picture A and the picture D;
    decoding means for decoding an output of said first encoding means;
    an interpolating filter for interpolating an output of said decoding means with a portion of pixels which have been thinned by said thinning filter;
    a subtractor for subtracting an output of said interpolating filter from the picture C; and
    second encoding means for high-efficiency encoding an output of said substractor.

11. An encoding apparatus according to claim 10, wherein data quantity Dx of an encoded signal x obtained by said first encoding means and data quantity Dy of an encoded signal y obtained by said second encoding means have a relationship of $Dx \leq Dy$.

12. An encoding apparatus according to claim 10, wherein the horizontal to vertical screen frame ratio of the picture A is 4:3.

13. An encoding apparatus according to claim 10, wherein the horizontal to vertical screen frame ratio of the picture A is 16:9.

14. An encoding apparatus according to claim 10, wherein the number of horizontal pixels of the picture A is smaller than the number of horizontal pixels of the picture C.

15. An encoding apparatus according to claim 10, wherein the number of horizontal pixels of the picture A is equal to the number of horizontal pixels of the picture C.

16. An encoding apparatus according to claim 10, wherein said thinning filter limits band of an area having a smaller number of horizontal pixels than the number of horizontal pixels of the picture C, to obtain a picture D having the same number of pixels as the number of pixels of the picture A.

17. An encoding apparatus according to claim 10, wherein said thinning filter limits band of an area having a smaller number of vertical pixels than the number of vertical pixels of the picture C, to obtain a picture D having the same number of pixels as the number of pixels of the picture A.

18. An encoding apparatus for a video signal according to claim 10, wherein the number of horizontal pixels for an area having a smaller number of horizontal pixels than the number of horizontal pixels of the picture C is equal to the number of horizontal pixels of the picture A.

19. An encoding apparatus according to claim 10, wherein said second encoding means includes:
- a blocking circuit for putting an input picture into blocks of a predetermined size and at the same time for outputting a control signal for deciding whether said blocks are for a picture for which a differential processing has been carried out or not;
- an orthogonal transformer for orthogonally transforming an output of said blocking circuit; and
- an encoder for quantizing a DC component of an output of said orthogonal transformer together with other AC components in the same manner when the blocks have been obtained as a result of a differential processing by a control signal which is an output of said blocking circuit.

* * * * *